(12) United States Patent
Lott et al.

(10) Patent No.: US 10,746,698 B2
(45) Date of Patent: Aug. 18, 2020

(54) EDDY CURRENT PIPELINE INSPECTION USING SWEPT FREQUENCY

(71) Applicant: Exxam Systems, LLC, Anchorage, AK (US)

(72) Inventors: Paul Lott, Anchorage, AK (US); Yuan Ji, Ames, IA (US)

(73) Assignee: Exxam Systems, LLC, Anchorage, AK (US)

( * ) Notice: Subject to any disclaimer, the term of this patent is extended or adjusted under 35 U.S.C. 154(b) by 341 days.

(21) Appl. No.: 15/841,714

(22) Filed: Dec. 14, 2017

(65) Prior Publication Data

US 2018/0217100 A1    Aug. 2, 2018

Related U.S. Application Data

(60) Provisional application No. 62/452,952, filed on Jan. 31, 2017.

(51) Int. Cl.
*G01N 27/90* (2006.01)
*G06F 17/14* (2006.01)

(52) U.S. Cl.
CPC ......... *G01N 27/9046* (2013.01); *G06F 17/14* (2013.01)

(58) Field of Classification Search
CPC .................................. G01N 27/9046
See application file for complete search history.

(56) References Cited

U.S. PATENT DOCUMENTS

| 3,135,914 A | 6/1964 | Callan et al. |
| 4,929,898 A * | 5/1990 | Spies ............... G01N 17/00 324/242 |
| 4,990,851 A * | 2/1991 | Spies ............... G01B 7/10 324/230 |
| 5,119,023 A | 6/1992 | Lloyd |
| 5,237,271 A | 8/1993 | Hedengren |

(Continued)

FOREIGN PATENT DOCUMENTS

| JP | 4998821 B2 | 8/2012 |
| WO | 2007064677 A1 | 6/2007 |

OTHER PUBLICATIONS

International Search Report and Written Opinion for counterpart International Application No. PCT/US2018/015908, dated Apr. 25, 2018 (17 pages).

(Continued)

*Primary Examiner* — Raymond L Nimox
(74) *Attorney, Agent, or Firm* — Perkins Coie LLP

(57) ABSTRACT

Apparatuses and methods for inspecting a section of piping are disclosed. In one example embodiment, an apparatus includes first and second excitation coils, a plurality of magnetometers, and a data acquisition system. The first excitation coils are disposed at a first axial location and are energized with a first swept frequency waveform and the second excitation coils are disposed at a second axial location and are energized with the swept frequency waveform. The plurality of magnetometers are disposed at an axial location between the first and second axial locations and are positioned to detect magnetic fields generated by eddy currents induced in the section of piping by the first and second excitation coils. The data acquisition system is operatively connected to receive output data from the plurality of magnetometers.

20 Claims, 6 Drawing Sheets

(56) References Cited

U.S. PATENT DOCUMENTS

| | | | |
|---|---|---|---|
| 5,329,561 A | 7/1994 | Desruelles | |
| 5,446,382 A | 8/1995 | Flora | |
| 5,793,205 A | 8/1998 | Griffith et al. | |
| 6,456,066 B1 | 9/2002 | Burd et al. | |
| 8,306,747 B1* | 11/2012 | Gagarin | G01C 7/04 701/408 |
| 8,395,376 B2* | 3/2013 | Singer | G01N 17/006 324/200 |
| 10,324,062 B2* | 6/2019 | Denenberg | G01N 27/9046 |
| 2010/0017137 A1 | 1/2010 | Legendre et al. | |
| 2010/0207620 A1* | 8/2010 | Gies | G01N 27/9033 324/240 |
| 2011/0068784 A1 | 3/2011 | Sun et al. | |
| 2011/0127999 A1* | 6/2011 | Lott | G01R 33/04 324/239 |
| 2013/0124109 A1* | 5/2013 | Denenberg | G01N 17/04 702/35 |
| 2016/0103099 A1 | 4/2016 | Lott et al. | |
| 2016/0168975 A1* | 6/2016 | Donderici | E21B 47/0006 324/238 |
| 2016/0370166 A1 | 12/2016 | Yang et al. | |
| 2017/0261469 A1* | 9/2017 | Chang | E21B 47/00 |

OTHER PUBLICATIONS

International Preliminary Report on Patentability received for counterpart International Application No. PCT/US2015/054735; dated Apr. 20, 2017, 12 pages.

International Search Report and Written Opinion received for counterpart International Application No. PCT/US2015/054735; dated Jan. 15, 2016, 15 pages.

* cited by examiner

EDDY CURRENT PIPELINE INSPECTION USING SWEPT FREQUENCY

CROSS-REFERENCE TO RELATED APPLICATIONS

This application claims the benefit of U.S. Provisional Patent Application No. 62/452,952, filed on Jan. 31, 2017 and entitled "EDDY CURRENT PIPELINE INSPECTION USING SWEPT FREQUENCY," which is incorporated herein by reference in its entirety.

TECHNICAL FIELD

The present technology is directed to methods and apparatus for inspecting a section of piping, in particular to non-invasive inspection methods.

BACKGROUND

Inspection of various piping systems and pipelines for defects, cracks, corrosion, wear and the like is important for maintaining the integrity of such systems, and avoiding potentially catastrophic consequences from failure of pipes during use. In some applications the piping systems are used to transport hot and/or corrosive materials. Often such piping systems are provided with an exterior layer of insulation or the like, which prevents visual inspection of the piping system, and inhibits conventional inspection systems that require direct access to the pipes. In another example, piping systems for transporting petroleum products or the like over large distances often include a thick layer of polymeric insulation and an outer metal sheathing. Such piping systems are extremely difficult and costly to effectively monitor for wear, corrosion, damage and similar defects. Other piping systems are difficult to access for other reasons. For example, piping systems and risers associated with off-shore drilling, including for example steel catenary risers, are substantially located underwater, and therefore difficult and expensive to monitor. Such piping systems may also be coated or encased with a protective outer casing, for example a plastic or elastomeric outer jacket.

Non-invasive analysis of pipes can be performed by inspecting eddy currents induced in a section of the pipe. However, existing methods for processing and analyzing eddy currents are either too slow or suffer from poor signal-to-noise ratios. Accordingly, there is a need for improved eddy current inspection techniques.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

The systems and methods disclosed herein can be combined with the disclosed systems and methods in commonly-owned application U.S. Ser. No. 14/878,736, filed Oct. 8, 2015 and published as U.S. Patent Publication No. 2016/0103099, which is hereby incorporated by reference in its entirety.

Previously disclosed methods of inspecting pipelines using eddy currents are either too slow or suffer from poor signal-to-noise ratios. For example, evaluation with a single-frequency waveform has an unacceptably high signal-to-noise ratio and is unable to determine the depth of defects. An alternative approach is to use a transient pulsed decay waveform (i.e., capturing a time-domain response), however this method is too slow and unstable from one pipe to the next. While time-domain measurements are useful to evaluate defects, measurement in the frequency domain is inherently more reliable and stable than in the time domain. An indirect way of acquiring time-domain data is to record the magnetometer response in the frequency domain, then mathematically transform the data into a time-domain response (e.g., by using an inverse Laplace transform). This indirect method is not only as reliable as single frequency measurement but also has the detection power of traditional time domain measurement, with much greater speed. As described in more detail below, analyzing a section of pipe with a swept frequency waveform can enable rapid analysis with a high signal-to-noise ratio for detection and characterization of defects, including discrimination of the depth of any detected defects.

Figure 1:
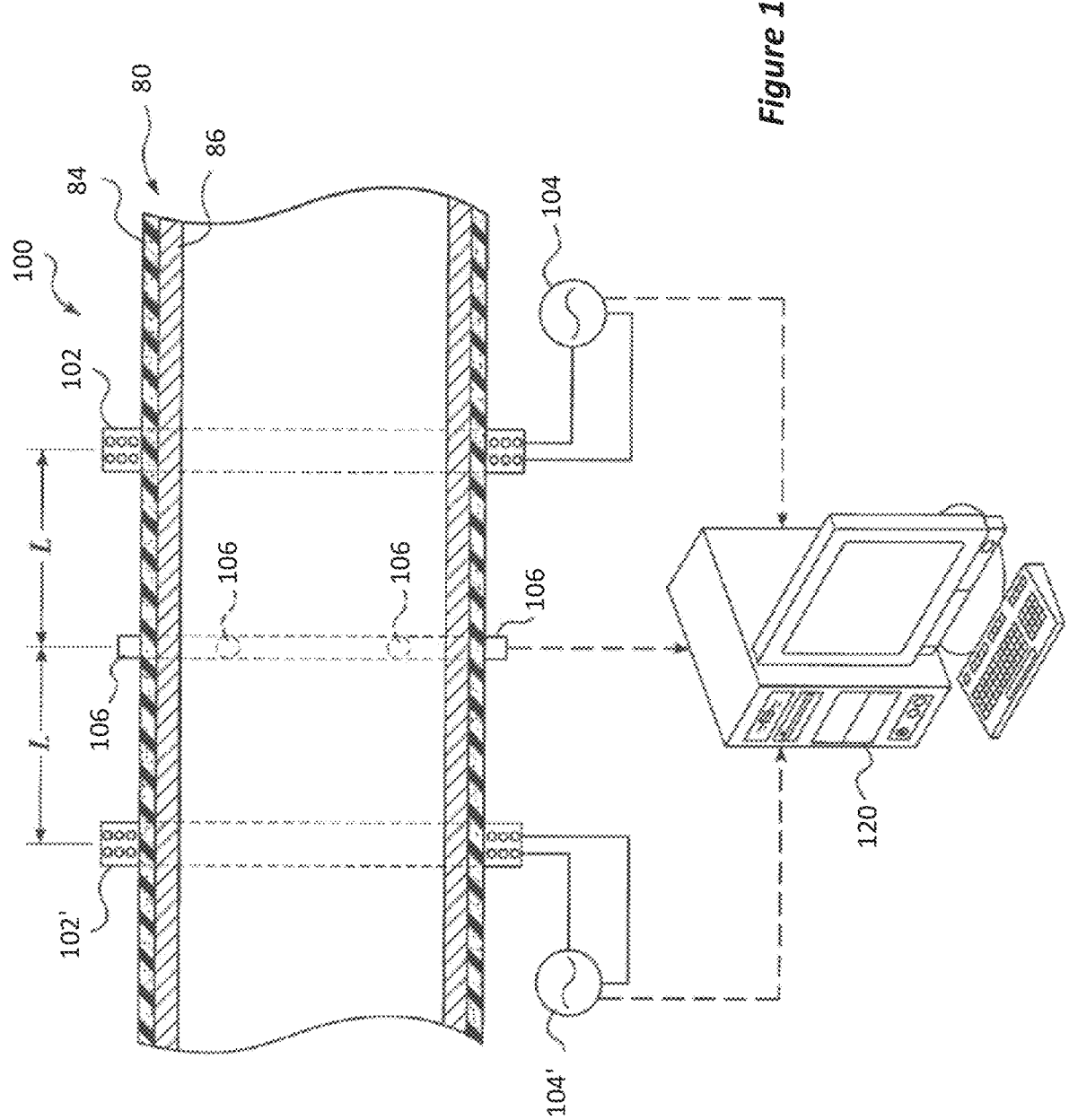
FIG. 1 is a diagram showing a pipe inspection apparatus in accordance with the present invention positioned for inspecting a section of sheathed pipe.

A first embodiment of an inspection system 100 in accordance with the present invention is shown schematically in FIG. 1. The inspection system 100 is particularly suitable for, but not limited to, inspecting a piping section 80 comprising a pipe 86 that is encased or covered with a sheath or protective covering 84. In an exemplary above ground oil pipeline, for example, a steel pipe 86 approximately ½-inch in thickness is encased in an elastic polymeric insulation 84 that may be several inches thick. A galvanized steel sheathing (not shown) may be wrapped over the outer face of the insulation 84, and sealed to mitigate or prevent the intrusion of water into the pipeline. It will be appreciated by persons of skill in the art that a piping system such as this presents significant obstacles to nondestructive monitoring or inspecting of the condition of the pipe 86. For example, visual inspection is impossible without undertaking the arduous task of removing at least a portion of the sheathing and insulation 84 from the pipe 86. The insulation 84 and the sheathing also hinders placement of a probe in direct contact the pipe 86. The thickness of the insulation 84, in particular, prevents placing a probe in close proximity to the surface of the pipe 86. The sheathing will typically interfere with conventional electromagnetic nondestructive examination (NDE) systems.

The inspection system 100 includes two spaced apart excitation coils 102, 102' that are positioned around the piping section 80 at selected axial positions. For convenience, the excitation coils 102, 102' may be provided on a spool or pair or spools each having a hinge or other mechanism to allow the spool to be opened and placed around the piping section. For example, the coils 102, 102' may be mounted on a hinged spool wherein the individual loops of the coils 102, 102' engage an electrical connector-type joint that is releasably engageable (not shown), such that the coils 102, 102' may be opened for attachment to a piping section 80 from an intermediate location along the piping section 80. Excitation coils 102, 102' are typically constructed by loops of a conductive material, such as copper wire, wrapped around the spool.

The first excitation coil 102 is connected to an AC power supply 104 that produces a first alternating current, and the second excitation coil 102' is connected to the AC power supply 104' such that the second excitation coil is energized with a second alternating current that is of opposite polarity but otherwise the same as the first alternating current. The AC power supply 104' may be a separate power supply from AC power supply 104, but preferably is the same power supply, wired in series opposing such that an opposite polarity signal is applied to the second excitation coil 102'. In some embodiments, the excitation coils 102, 102' can be energized with similar alternating currents having the same polarity.

A plurality of magnetic field detectors, for example magnetometers 106 are positioned about the piping section 80 at an axial distance L from each of the excitation coils 102, 102'. Preferably, the magnetometers 106 are located between the excitation coils 102, 102' so that they detect the generated magnetic field from signals applied to the pipe by the citation coils at approximately the same time. In one embodiment, the magnetometers 106 comprise vector magnetometers, and more particularly fluxgate magnetometers. A suitable power supply (not shown) for the magnetometers 106 is also provided. It is contemplated that other types of magnetic field detectors may alternatively be used, for example magnetoresistive magnetometers (e.g., giant magnetoresistive or anisotropic magnetoresistive magnetometers).

Excitation currents applied to the excitation coils 102, 102' ranging from 2 amps to 20 amps have been used and found to be effective, with the eddy current signal strength increasing with increasing excitation current. Use of excitation currents greater than 20 amps is also contemplated. In an exemplary embodiment an excitation current pulse is applied for approximately 1.5 seconds at each testing point, so the total power requirements even at higher amperages are not prohibitive.

The magnetometers 106 are circumferentially spaced around the piping section 80 approximately adjacent the protective covering 84. For convenience the magnetometers 106 can be mounted on an annular frame for easy and consistent positioning. The frame may also be hinged or otherwise openable, such that the magnetometers 106 may engage the piping section 80 from an intermediate location. In one embodiment, six fluxgate magnetometers 106 are positioned at equal circumferential intervals about the piping section 80. In another embodiment thirty-six (36) magnetometers are mounted to the frame. In general, it is believed that more magnetometers 106 will provide greater resolution of the condition of the pipe 86. The number of magnetometers used, however, may be proportional to the size of the pipe being examined. More magnetometers 106 may be desired to examine, for example, larger diameter piping. As such magnetometers are preferably equally spaced around the pipe, multiples of magnetometers that evenly divide 360 degrees are typically utilized. The excitation coils 102, 102' and the magnetometers 106 may be interconnected with spacers, such as longitudinal rods or the like, to maintain a desired spacing between the coil 102 and the magnetometers 106.

In some embodiments, a plurality of electromagnets (not shown) can be mounted about the piping section and connected to power supplies such that the electromagnets produce a magnetic field that at least partially saturates the magnetically permeable outer sheathing of the pipe, thereby improving the ability of the excitation coils 102, 102' to induce eddy currents in the pipe 86. It is also contemplated that other magnetic means, for example rare earth magnets or the like, may alternatively be used instead of electromagnetics. Alternatively, the inspection may be conducted without the electromagnets. For example, in piping configurations wherein no magnetically permeable sheathing is present, a system without electromagnets may be preferred. Even in applications where a sheathing is present, the electromagnets may need not be used so long as magnetic fields generated from eddy currents induced in the pipe 86 by the coils 102, 102' can be adequately detected. Generally, embodiments of the technology may be used for inspecting pipes of different configurations, for example, pipes not having insulation disposed between a sheathing and the pipe, or not having a sheathing covering the pipe. Embodiments of the technology may be used for inspecting pipes having different sheathing materials. For example, pipes having non-metallic sheathing or coating, such as those having concrete coatings or having high-density polyethylene coatings, may be inspected using embodiments of the technology.

A data acquisition system 120 is operatively connected to the magnetometers 106 and the AC power supplies 104, 104'. The data acquisition system 120 controls or monitors the application of the AC power to the excitation coils 102, 102', and receives the sensor date from the magnetometers 106, which data is used to evaluate and inspect the pipe 86 in the vicinity of the magnetometers 106. The data acquisition system 120 may be physically connected to the system 100 or wireless means may be used to communicate with the other components of the system, as is well-known in the industry.

It should also be appreciated that although a separate data acquisition system 120 and AC power supplies 104, 104' are indicated in FIG. 1, it is contemplated and will be within the skill in the art to alternatively provide an on-board microcomputer board or the like and a suitable power supply to the system 100 to control the operation and record data received from the magnetometers 106. When so configured, the pipe-mounted system is a self-contained and stand-alone system.

It is also contemplated that automated operation of the system may be readily accomplished by providing components for sensing the position and/or movement of the system 100. For example, in a current embodiment the system is provided with a global positioning system (GPS) module, and with triaxial accelerometers. Data from the GPS, accelerometers and magnetometers may be wirelessly transmitted to an on-board or remote data acquisition system and used to determine the precise location and orientation of the system 100 as the pipe inspection process progresses.

To inspect a piping section 80 the excitation coils 102, 102' and magnetometers 106 are placed about the piping section 80. A drive current is applied to the excitation coils 102, 102' and eddy currents induced in the pipe. The induced eddy currents generate changes in the magnetic field adjacent the pipe, which are detected by magnetometers 106. The responsive signals from the magnetometers 106 are received by the data acquisition system 120. The entire assembly is then moved axially along the piping section 80, and the magnetometer 106 data sequentially recorded. The data is then analyzed to identify and evaluate locations of defects in the pipe 86.

It will be appreciated by persons of skill in the art that the eddy currents produced in the pipe 86 by the excitation coils 102, 102' will be impacted by defects or other anomalies in the pipe such as cracks, corrosion, pitting or the like. Changes in the eddy currents produced in the pipe 86 will cause corresponding changes in the magnetic fields induced by the eddy currents. Therefore, the data received from the magnetometers 106 may be used to identify defects and/or regions of concern in the pipe 86. It is contemplated that the process of moving the pipe inspection system 100 axially along the piping section 80 may be automated, such as by the use of a stepping motor and track designed to guide the pipe inspection system 100 along.

In some embodiments, the magnetometers 106 are configured to detect magnetic flux along the axial direction. In some embodiments, the magnetometers 106 can be configured to instead detect magnetic flux along the radial direction. In certain embodiments, two rings of magnetometers may be provided, with some magnetometers detecting magnetic flux in the axial direction, and other magnetometers detecting magnetic flux in the radial direction. The different measurements of magnetic flux may be carried out sequentially (e.g., first the axial magnetic flux is measured, followed by measurement of the radial magnetic flux), or in some embodiments the measurements may be carried out simultaneously.

Figure 2A:
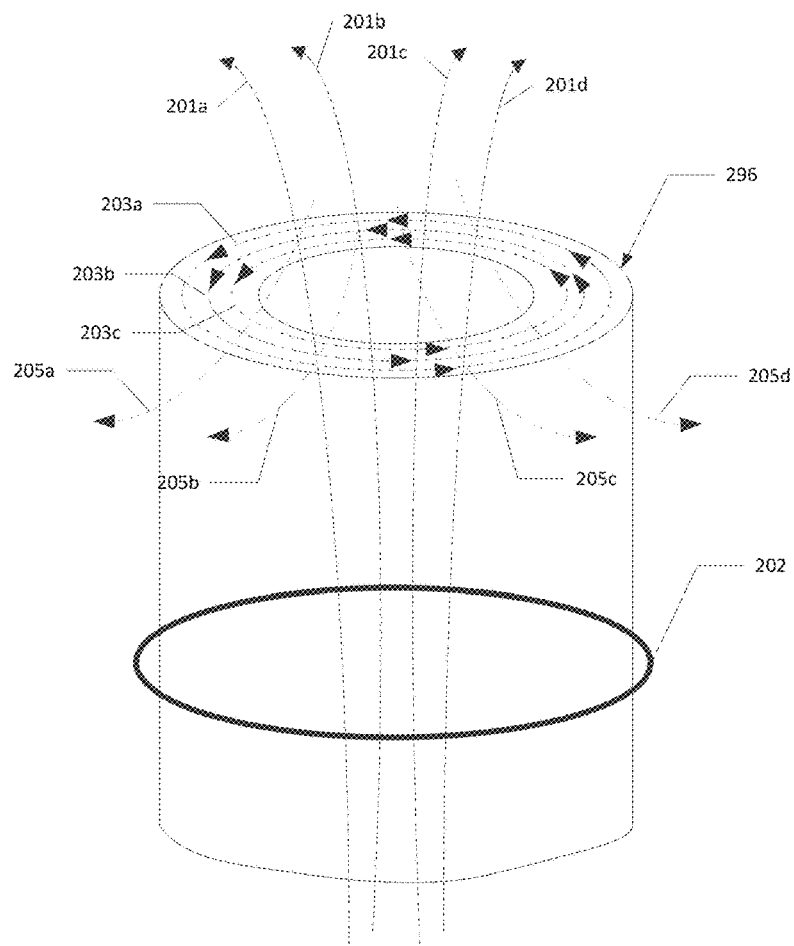
FIGS. 2A and 2B are schematic side perspective and top views, respectively, of an excitation coil disposed adjacent to a section of pipe.
Figure 2B:
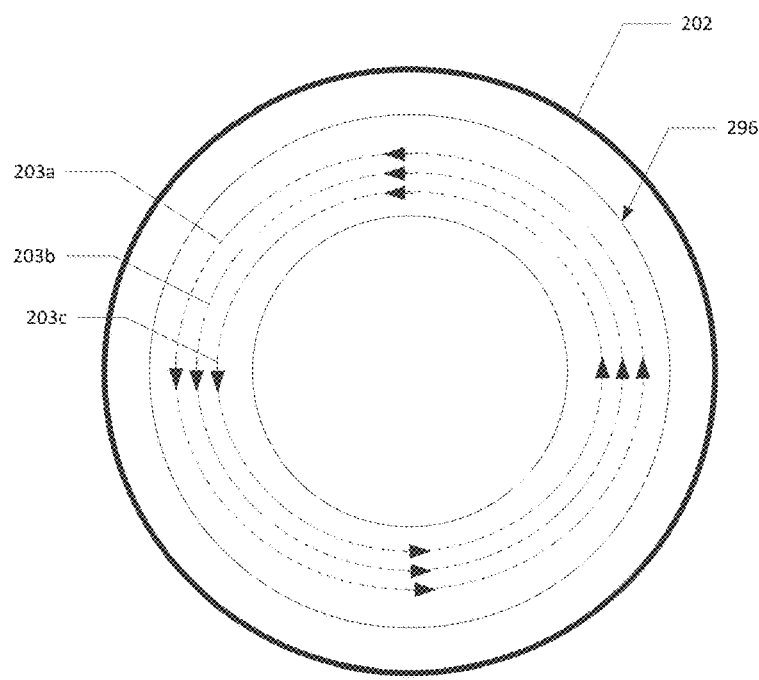

FIGS. 2A-2B are schematic side perspective and top views, respectively, of an excitation coil disposed adjacent a section of pipe. As illustrated, excitation coil 202 surrounds a segment of pipe 296. The excitation coil 202 can be substantially similar to the excitation coils 102, 102' described above. Running alternating current through the excitation coil 202 induces a changing primary magnetic field disposed generally axially along the pipe 296, as indicated by field lines 201*a-d*. This primary magnetic field in turn induces the eddy currents 203*a-c* at varying depths within the pipe 296. Eddy currents 203*a-c* then induce the secondary magnetic fields indicated by field lines 205*a-d*. As noted previously, eddy currents 203*a-c* produced in the pipe 296 by the excitation coil 202 will be impacted by defects or other anomalies in the pipe 296 such as cracks, corrosion, pitting or the like. Changes in the eddy currents 203*a-c* will in turn cause corresponding changes in the secondary magnetic fields 205*a-d* induced by the eddy currents 203*a-c*.

A second excitation coil (not shown) can be positioned around the pipe 296 at an axial distance from the first excitation coil 202. A second input AC signal can be supplied to the second excitation coil. In some embodiments, the second input signal is identical to the first input signal but with opposite polarity. In some embodiments, the excitation coils can be energized with alternating currents having the same polarity. In some embodiments, the alternating currents may be partially shifted with respect to each other such that they do not have the same or opposite polarities.

A plurality of magnetometers (not shown) are positioned radially around the pipe 296 to detect the secondary magnetic fields 205*a-d*. As noted above, the secondary magnetic fields 205*a-d* will be affected by defects or other anomalies in the pipe 496, due to the defect and anomaly effects on the eddy currents 203*a-c*. In some embodiments, the input signals can be captured in the time domain and a Fast Fourier Transform (FFT) can be used to retrieve the amplitude and phase information for the input signals. The detected secondary magnetic fields observed by each magnetometer are likewise captured in the time domain and a FFT can be used to retrieve amplitude and phase information for the output signals of each magnetometer. These two sets of complex quantities can be divided, providing normalized responses for each magnetometer. The derived normalized responses can then be used to detect any defects within the pipeline.

As illustrated in FIG. 2B, eddy currents 203*a-c* are produced at different depths within the pipe 296. Depending on the frequency of the AC applied to the excitation coil 202, various depths can be achieved. For example, a higher frequency current applied to the excitation coil 202 may induce a relatively shallow eddy current 203*a* (i.e., closer to the outer surface of the pipe 296). A lower frequency current applied to the excitation coil 202 may in turn induce a relatively deeper eddy current 203*c* (i.e., closer to the inner surface of the pipe 296). The depth of the eddy current will depend on the characteristics of the AC signal applied to the excitation coil, the configuration of the coil, and the dimensions and materials of the pipe itself. In cases involving metallic pipes, a relatively low (e.g., <500 Hz) frequency may be sufficient to induce the desired eddy currents. In cases involving composite pipes (rather than metallic), a significantly higher frequency (e.g., 20 GHz) may be applied to induce currents.

By utilizing varying frequencies to produce eddy currents of varying depths, the depth of a defect can be detected in addition to detecting its axial location. For example, a scan that sweeps through multiple frequencies can indicate both the axial location of the defect as well as the depth of the defect.

In various embodiments the swept frequency waveform can be synthesized using a field programmable gate array (FPGA). At the highest level, FPGAs are reprogrammable silicon chips. Using prebuilt logic blocks and programmable routing resources, these chips can be configured to implement custom hardware functionality. Accordingly, FPGAs provide the same flexibility of software running on a processor-based system, but are not limited by the number of processing cores available. Unlike processors, FPGAs are truly parallel in nature, so different processing operations do not have to compete for the same resources. Each independent processing task is assigned to a dedicated section of the chip, and can function autonomously without any influence from other logic blocks. As a result, the performance of one part of the application is not affected when more processing is added.

Figure 7:
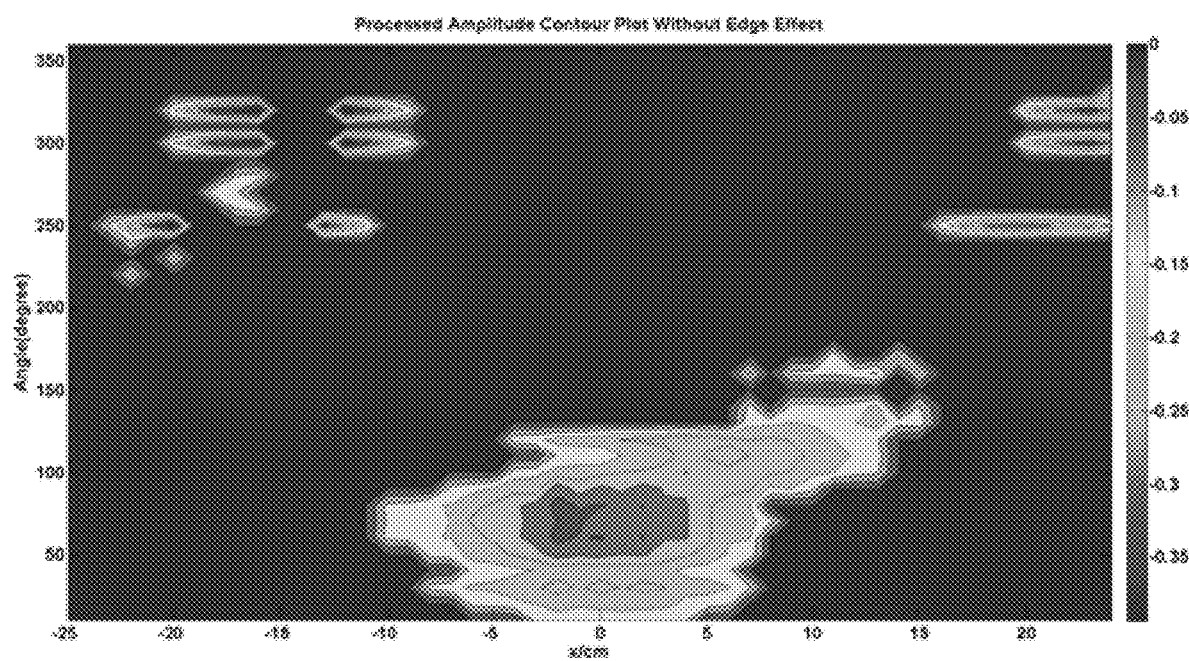
FIG. 7 illustrates a false-color graph of the detected secondary magnetic fields induced by the eddy currents.

Data representing the detected magnetic fields can be presented in a number of visual forms, for example in some embodiments a color-shading graph can be provided with varying colors reflecting the magnitude of the detected secondary magnetic fields induced by the eddy currents. One example is shown in FIG. 7. As illustrated, shading represents the magnetic field in units of microTesla as indicated on the vertical scale on the right of the diagram. The horizontal axis denotes the direction of the pipe and tool axis. The vertical axis denotes the angle in degrees of the sensor location measured, in this case, from the bottom of the pipe. The diminished magnetic field near the center of the pipe in the axial direction, and at approximately 75 degrees from the bottom of the pipe, indicates the location of a defect. Such a color-shaded graph can provide a simple and effective way to rapidly identify any defects in the pipe due to anomalous or irregular shading patterns. Various other such graphical or visual presentations of the magnetic field data can be utilized. In some embodiments, the system can automatically analyze data from the detected magnetic fields to determine whether a defect has been identified without the need for an operator to visually inspect a graphical output. For example, a threshold filter or other such filter can determine whether the detected secondary magnetic fields in a given region of the pipeline deviate from the mean values by more than a predetermined amount. If this condition is satisfied, the defect is flagged at that location. In some embodiments, such a filter can be configured to detect defects when deviations are detected over a certain pre-determined size threshold, so as to avoid false positives associated with small deviations in isolated areas that do not correspond to actual defects in the pipeline. In some embodiments, such an automatically detected defect can trigger an alarm or other such indicator that a defect has been found in the pipeline.

As noted above, during inspection the system 100 is moved along the piping section. The eddy current signals measured by the magnetometers are recorded to a data acquisition unit. An optional motion tracking system, such as accelerometers and/or GPS systems may be provided to detect and track the motion of the system along the piping section. It is contemplated that the system may be provided with a drive system (not shown) for automatically moving the system along the piping section, or may be configured for manual operation. In some embodiments, the drive system can move the assembly along the pipeline continuously at a rate of at least 5 feet per minute. In some embodiments, the drive system can move the assembly along the pipeline in steps, for example 1-inch increments, at a rate of at least 5 feet per minute.

Embodiments of the pipeline inspection assembly can be adapted for pipes of various sizes, for example ranging from 4 inches to 24 inches outer diameter. Some embodiments may be adapted for inspecting pipes having layers of insulation around the pipe, for example up to 4 inches thick. In such embodiments, physical dimensions of the spool can be configured to accommodate the larger pipeline. The size of the excitation coils 102, 102' can likewise be configured to accommodate a particular size pipeline, for example by being formed with greater or smaller radii, and/or by increasing the length of the coils. In embodiments of the pipeline inspection assembly that are configured for use with larger pipelines, the number of magnetometers 106 can be increased to maintain sufficient resolution in detecting defects in the pipeline.

Figure 3:
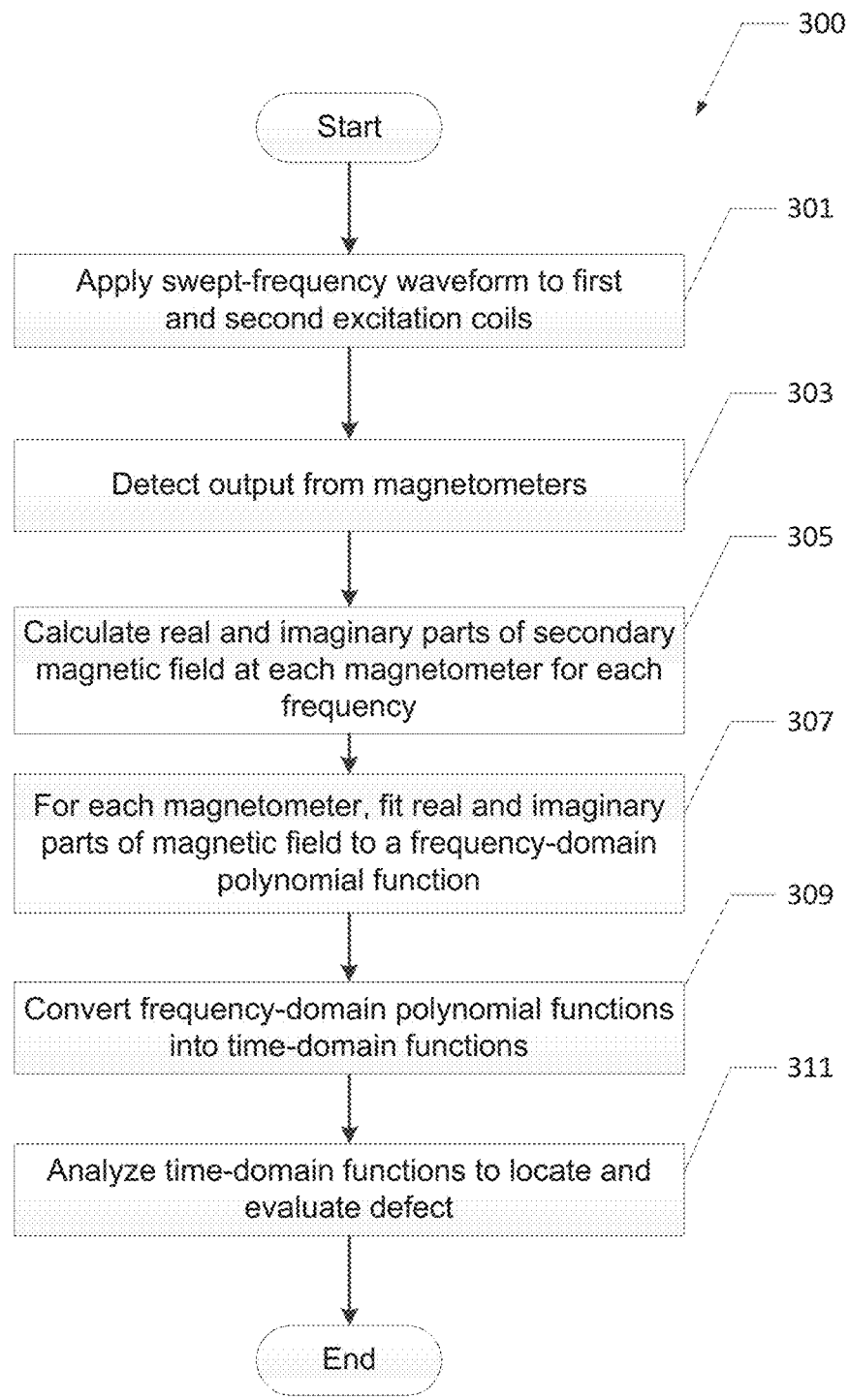
FIG. 3 is a flow diagram of a method for analyzing a section of pipe with a swept frequency waveform.
Figure 4:
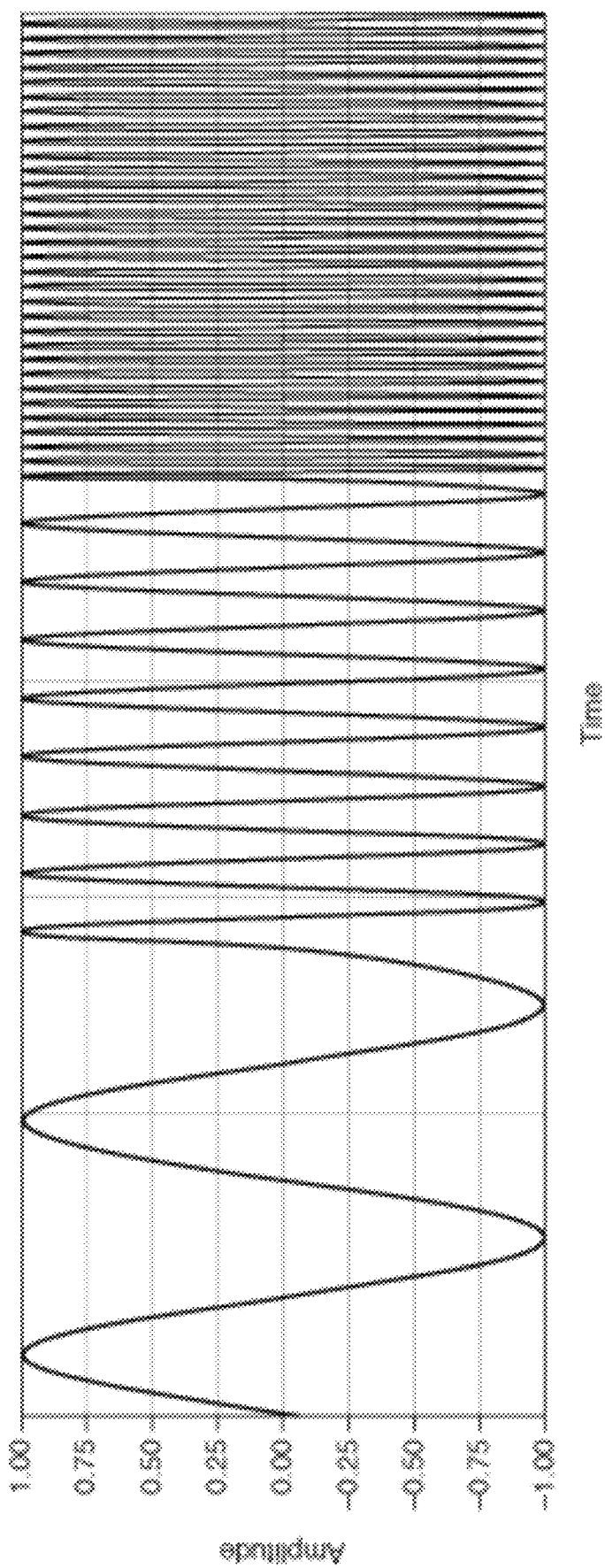
FIG. 4 illustrates an example swept frequency waveform.

FIG. 3 is a flow diagram of a method implemented by the data acquisition system 120 for analyzing section of pipeline with a swept frequency waveform. The process 300 begins in block 301 by applying a swept frequency waveform to first and second excitation coils. As described above, the swept frequency waveform can step discretely through a number of frequencies, for example 2, 4, 6, 8, 10, 16, or more, or in other embodiments the swept frequency waveform can continuously sweep through a range of frequencies. In at least one embodiment, the swept frequency waveform steps through 16 frequencies, for example from 10 Hz up to 170 Hz in increments of 20 Hz. Other variations are possible, for example using fewer or greater numbers of frequencies, with larger or smaller increments, and with lower or higher ends of the frequency range. One exemplary swept frequency waveform is illustrated in FIG. 4, in which the waveform steps sequentially through three different frequencies. The first and second excitation coils are positioned around a section of pipe and located so as to induce eddy currents in the pipe. In some embodiments, the swept frequency waveform applied to the first excitation coil can have the same polarity as the swept frequency waveform applied to the second excitation coil, and the two swept frequency waveforms can be in phase with one another. In this configuration, the swept frequency waveforms constructively interfere along the axial direction, while the induced secondary magnetic fields (extending generally along the radial direction) will destructively interfere, thereby increasing sensitivity in measuring disturbances of these secondary magnetic fields. In other embodiments, the swept frequency waveform applied to the first excitation coil can have a first polarity and the swept frequency waveform applied to the second excitation coil can have a second, opposite polarity. The second excitation coil can be similarly disposed around a section of pipeline, and can be positioned at an axial distance from the first excitation coil.

Figure 5:
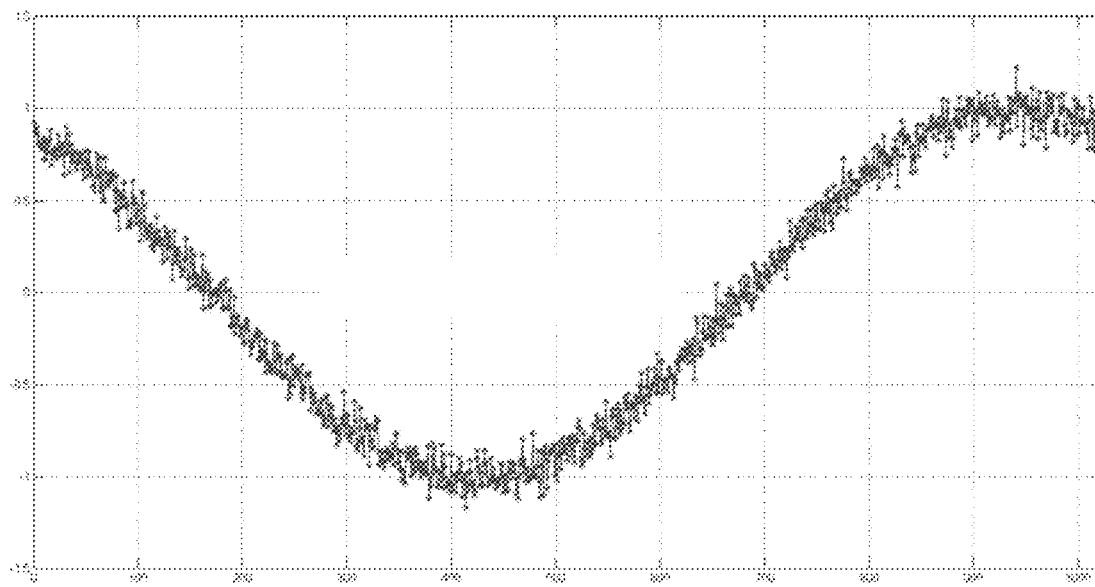
FIG. 5 illustrates an example sampled frequency from a magnetometer during swept frequency testing.

Process 300 continues in block 303 with detecting output from the magnetometers. As described above, a plurality of magnetometers can be radially spaced around a section of piping, for example at an axial position substantially centrally between the first and second excitation coils. In one embodiment, applying the swept frequency technique involves applying a first frequency of the swept frequency waveform and sampling the magnetometers a predefined number of times, e.g., 1024 times at each magnetometer. One example of a sampled waveform for a particular magnetometer is illustrated in FIG. 5.

Figure 6:
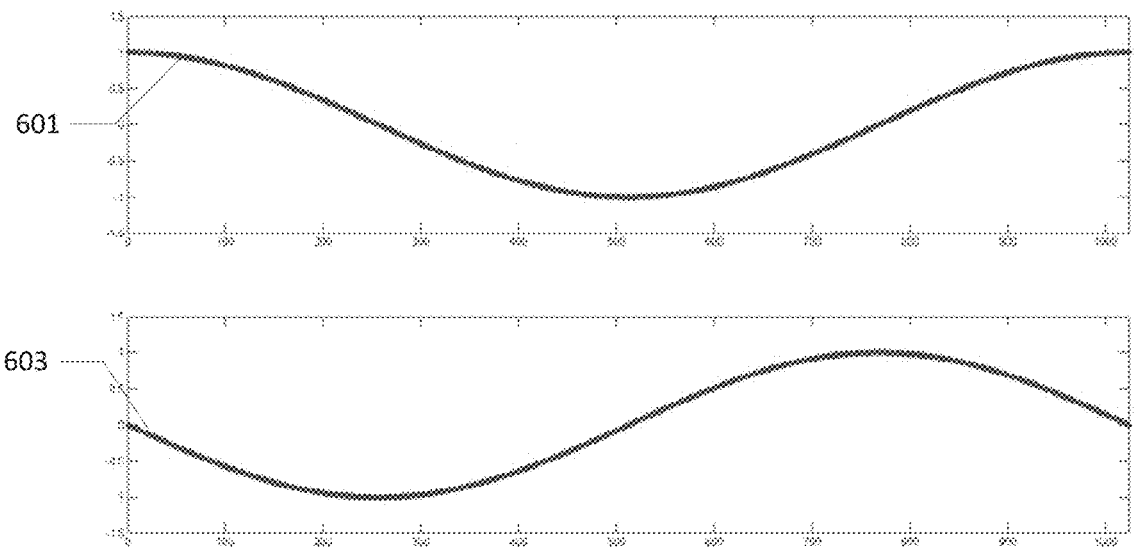
FIG. 6 illustrates example first and second sinusoidal testing waveforms.

The routine 300 continues in block 305 with calculating real and imaginary parts of the secondary magnetic fields. For example, the sampled frequency obtained from each magnetometer can then be used to compute an inner product (dot product) of the sampled frequency and a first sinusoidal testing waveform. Next, a second inner product (dot product) is computed of the sampled frequency and a second sinusoidal testing waveform. The first and second inner products are then normalized (e.g., the value for each is divided by the square root of the sum of the squared first inner product and the squared second inner product). In this embodiment, the first and second sinusoidal testing waveforms are orthogonal. Example first and second sinusoidal testing waveforms are illustrated in FIG. 6, in which the first sinusoidal testing waveform 601 takes the form of Y=cos (wt) and the second sinusoidal testing waveform 603 takes the form of Y=cos(wt+pi/2). The first normalized inner product corresponds to the real part of the measured magnetic field induced by the eddy currents, and the second normalized inner product corresponds to the imaginary part of the magnetic field induced by the eddy currents.

The next frequency in the swept frequency waveform is applied to the excitation coils and the process repeated. As a result, for each frequency of the swept frequency waveform, real and imaginary parts of the secondary magnetic fields are calculated for each magnetometer. This technique allows for the accurate extraction of frequency-domain information without using a Fast Fourier Transform (FFT). In some embodiments, this analysis is performed only for one or two periods for each frequency, significantly reducing the time needed to perform the analysis as compared to conventional techniques. In some embodiments, the real and imaginary parts of the magnetic field as measured at each magnetometer for each frequency in the swept frequency waveform can then be used to determine the presence of any defects. For example, in one embodiment, the measurements at a particular magnetometer at two different frequencies can be combined (e.g., taking the real part of the magnetic field at 20 Hz and subtracting 20% of the real part of the magnetic field at 80 Hz) to provide a single value for that magnetometer at that position. This value can then be compared to values at neighbor positions (e.g., adjacent magnetometer values while the apparatus is in the same position, or adjacent values from the same magnetometer when the apparatus is in adjacent axial positions along the pipe) to determine the presence of any defect.

Returning to FIG. 3, the routine 300 continues in block 307 with fitting the real and imaginary magnetic fields from each magnetometer to a polynomial function. In one embodiment, the analysis begins with the calculated real and imaginary magnetic fields for each magnetometer for each of the frequencies of the swept frequency waveform (e.g., 16 real and 16 imaginary parts for each magnetometer in the case of a swept frequency waveform with 16 frequencies). Next, a nonlinear regression is used to fit the 16 frequencies into a polynomial that gives real and imaginary values for each frequency. In some embodiments, the polynomial can be limited to fourth-order or lower polynomial. In other embodiments, the polynomial can be a higher order polynomial. The nonlinear regression fit can include an error threshold in order to ensure an acceptable fit. In one example, a non-linear regression can be performed using the Matlab function nlinfit. In other embodiments, other regression techniques can be used, for example linear regression.

The routine 300 continues in block 309 with converting the frequency-domain polynomial functions for each magnetometer into time-domain functions. For example, the polynomial functions can be converted into time domain using an Inverse Laplace Transform or Talbot Inversion. This expression as a function of time will generally take the form of a decay curve.

For example, the Talbot inversion formula to numerically calculate f(t) for real-valued f is $$f_b(t, M) = \frac{2}{5t} \sum_{k=0}^{M-1} \text{Re}\left(\gamma_k \hat{f}\left(\frac{\delta_k}{t}\right)\right)$$

(subscript b for TalBot), where $$\delta_0 = \frac{2M}{5} \quad \delta_k = \frac{2k\pi}{5}(\cot(k\pi/M) + i), 0 < k < M, \gamma_0 = \frac{1}{2}e^{\delta_0},$$

$$\gamma_k = [1 + i(k\pi/M)(1 + [\cot(k\pi/M)]^2) - i \cot(k\pi/M)]e^{\delta_k}, 0 < k < M,$$

In block 311, the time-domain functions are evaluated to locate and evaluate a defect. In some embodiments, the resulting time-domain curves can be evaluated between the times of 10 ms and 50 ms, though in other embodiments the time between 0-10 ms and/or the time beyond 50 ms can also be evaluated (in each case, the time scale beginning after application of the excitation signal). If there is no defect present, the time-domain curve will have a particular slope. However, in the presence of a defect, the resulting time-domain curve will have a slope that deviates from the no-defect case. For example, the time-domain curve may have a steeper slope in the presence of a defect. In one embodiment, each time-domain curve can be compared against its neighbor readings (e.g., the reading from that magnetometer at positions adjacent axial positions to the point in question, for example taken during a previous measurement and during the following measurement as the apparatus is moved axially along a length of pipe; or readings from adjacent magnetometers while the apparatus is in the same position along the length of pipe). If the time-domain curve for a particular position deviates from those of its neighbor positions more than a predefined amount (e.g., more than 10% deviation, more than 20% deviation, etc.), then the presence of a defect is indicated.

This technique allows a single swept frequency waveform to achieve the benefits of a pulsed decay approach, without suffering from the slow processing speed associated with pulsed decay testing. In some embodiments, the swept frequency analysis allows for determination of the depth of defects within the pipe. For example, by analyzing the decay profile and magnitude of the time-domain function, the axial location and depth of defects can be identified, including subsurface flaws. If the defect is on the external surface of the pipe, the loss is evident from the decay profile of the secondary magnetic field at an early stage. If the material loss is internal the dipole effect occurs later due to the time taken for the field to diffuse through the pipe wall. As a result, aberrations detected in the decaying output signal can be analyzed to determine the depth of any detected defect.

In some embodiments, rather than using a nonlinear regression followed by an inverse Laplace transform, the swept frequency response can be analyzed using a frequency mixing technique. In this approach, the sum of all measured frequency results (including a complex number for each frequency of the swept frequency waveform) is given a certain weight. For example, the result could be: F(sum)= 0.1*f(10 Hz)+0.2*f(20 Hz)+0.2*f(30 Hz)+0.5*f(100 Hz), wherein f(10 Hz) is the magnetometer response for the 10 Hz excitation frequency, f(20 Hz) is the magnetometer response for the 20 Hz excitation frequency, etc. While this method is straightforward to use, it presents difficulty in acquiring the correct weight for each frequency, particularly due to variations in measured responses depending on pipe characteristics. Numerical simulations or experimental measurements can be used to determine the appropriate weights for this frequency mixing approach.

In some embodiments utilizing the swept frequency technique, the apparatus is sufficiently sensitive to detect defects in the pipeline with a minimum size of 3T×3T×0.2T, where T is the nominal thickness of the pipe. In some embodiments, the apparatus is sufficiently sensitive to detect defects with a minimum size of 1T×1T×0.1T.

The previously described embodiments are described as having the magnetometers arranged around the circumference of the surface in a frame. In alternative embodiments, the magnetometers are arranged around the circumference of the surface in a plurality of frames. The plurality of frames may be disposed between the excitation coils. The frames may be positioned between the coils adjacent one another. The frames may also be evenly spaced between the coils in some embodiments. In some embodiments, the magnetometers of one frame may be angularly offset from the magnetometers of another frame.

The previously described embodiments of the technology have been shown and described as extending around the entire circumference of the pipe to be inspected. However, in alternative embodiments of the technology, the coils and magnetometers can extend over a portion less than the entire circumference. For example, although the particular embodiment illustrated in and described with reference to FIG. 1 includes coils 102, 102' and magnetometers 106 that extend around the entire circumference of the pipe to be inspected, the coils and magnetometer may extend over a shorter arc along the surface to be inspected. For example, in some embodiments, the coils 102, 102' and the magnetometers 106 extend over half of the circumference of the pipe to be inspected. In other embodiments, the coils 102, 102' may extend over a greater or lesser portion of the surface than one-half of the circumference.

Moreover, arrangement of the coils and magnetometers are not limited to an arrangement along a concave arc to be positioned against the exterior of a curved surface. For example, the coils and the magnetometer may be arranged in a substantially planar arrangement. Such an embodiment may be advantageous for inspecting a substantially planar surface or a curved surface having a relatively large diameter of curvature. The coils and the magnetometer may also be arranged along a convex arc to be positioned against the interior of a curved surface. Such an embodiment may be advantageous for inspecting an interior curvature of a curved surface.

CONCLUSION

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

Various embodiments described herein are described in the general context of method steps or processes, which may be implemented in one embodiment by a software program product or component, embodied in a machine/computer-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The terminology used herein is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

In the foregoing description, various embodiments have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

If desired, the different functions discussed herein may be performed in a different order and/or concurrently with each other. Furthermore, if desired, one or more of the above-described functions may be optional or may be combined.

Although various aspects of various embodiments are set out in the independent claims, other aspects of the present disclosure comprise other combinations of features from the described embodiments and/or the dependent claims with the features of the independent claims, and not solely the combinations explicitly set out in the claims.

The invention claimed is:

1. A method for inspecting a pipe, the method comprising:
   disposing a first excitation coil proximate the pipe at a first axial location;
   disposing a second excitation coil proximate the pipe at a second axial location axially spaced apart from the first axial location;
   disposing a plurality of magnetometers proximate the pipe at a third axial location between the first axial location and the second axial location;
   energizing the first excitation coil with a swept frequency waveform;
   energizing the second excitation coil with the swept frequency waveform;
   recording a plurality of signals from the plurality of magnetometers;
   fitting the signals to a frequency-domain polynomial function;
   converting the frequency-domain polynomial function into a time-domain function; and
   determining, based at least on part on the time-domain function, a location of a defect in the pipe.

2. The method of claim 1, wherein converting the frequency-domain polynomial function into a time-domain function comprises applying an Inverse Laplace Transform or Talbot Inversion to the frequency-domain polynomial function.

3. The method of claim 1, wherein fitting the signals to a frequency-domain polynomial function comprises applying a non-linear regression to the signals.

4. The method of claim 1, wherein the swept frequency waveform comprises at least 4 different frequencies.

5. The method of claim 1, wherein the swept frequency waveform comprises at least 16 different frequencies.

6. The method of claim 1, wherein determining a location of the defect comprises determining an axial location of the defect.

7. The method of claim 1, wherein determining a location of the defect comprises determining a depth of the defect.

8. The method of claim 1, wherein determining a location of the defect comprises determining an angular location of the defect.

9. The method of claim 1, wherein the defect is defined by a volume equal to or less than $3T \times 3T \times 0.2T$, where T is the thickness of the pipe.

10. A system for inspecting a pipe, the system comprising:
    a first excitation coil disposed at a first axial location of the pipe;

a second excitation coil disposed at a second axial location of the pipe;

an alternating current power source configured to energize the first and second excitation coils simultaneously with a swept frequency waveform;

a plurality of magnetometers disposed at an axial location between the first axial location and the second axial location, wherein the magnetometers are configured to detect magnetic fields generated by eddy currents induced in the pipe by the first and second excitation coils; and a data acquisition system operatively connected to receive output data from the plurality of magnetometers, the data acquisition system configured to analyze the output data and identify the presence of a defect in the pipe, wherein the data acquisition system is configured to:

fit the output data from the plurality of magnetometers to frequency-domain polynomial functions for each magnetometer;

convert the frequency-domain polynomial functions into time-domain functions; and identify, based at least on part on the time-domain functions, a location of a defect in the pipe.

11. The system of claim 10, wherein the data acquisition system is configured to convert the frequency-domain polynomial functions into time-domain functions by applying an Inverse Laplace Transform or Talbot Inversion to the frequency-domain polynomial functions.

12. The system of claim 10, wherein the data acquisition system is configured to fit the output data from the plurality of magnetometers to frequency-domain polynomial functions by applying a non-linear regression to the output data.

13. The system of claim 10, wherein the swept frequency waveform comprises at least 4 different frequencies.

14. The system of claim 10, wherein the swept frequency waveform comprises at least 16 different frequencies.

15. The system of claim 10, wherein the data acquisition system is configured to determine an axial location of the defect.

16. The system of claim 10, wherein the data acquisition system is configured to determine a depth of the defect.

17. The system of claim 10, wherein the data acquisition system is configured to determine an angular location of the defect.

18. A system for inspecting a pipe, the system comprising:

means for applying a swept frequency waveform to first and second excitation coils, wherein the first and second excitation coils are disposed at first and second axial locations of the pipe, respectively;

means for detecting magnetic fields generated by eddy currents induced in the pipe by the first and second excitation coils;

means for receiving output data from the means for detecting magnetic fields; and means for analyzing the output data and identifying the presence of a defect in the pipe, wherein the means for analyzing the output data is configured to:

fit the output data to frequency-domain polynomial functions;

convert the frequency-domain polynomial functions into time-domain functions; and identify, based at least on part on the time-domain functions, a location of a defect in the pipe.

19. The system of claim 18, wherein the means for analyzing the output data is configured to convert the frequency-domain polynomial functions into time-domain functions by applying an Inverse Laplace Transform or Talbot Inversion to the frequency-domain polynomial functions.

20. The system of claim 18, wherein the data means for analyzing the output data is configured to fit the output data from the plurality of magnetometers to frequency-domain polynomial functions by applying a non-linear regression to the output data.

* * * * *